No. 815,982. PATENTED MAR. 27, 1906.
M. SCHUBERT & O. RECHNITZ.
NUT.
APPLICATION FILED OCT. 19, 1903.

Witnesses:

Inventors:
Max Schubert
Otto Rechnitz

UNITED STATES PATENT OFFICE.

MAX SCHUBERT AND OTTO RECHNITZ, OF COTTBUS, GERMANY.

NUT.

No. 815,982. Specification of Letters Patent. Patented March 27, 1906.

Application filed October 19, 1903. Serial No. 177,627.

*To all whom it may concern:*

Be it known that we, MAX SCHUBERT and OTTO RECHNITZ, manufacturers, subjects of the German Emperor, residing at Cottbus, Germany, have invented certain new and useful Improvements in Nuts, of which the following is a specification.

The subject of the present invention is a female screw or nut which not only offers the advantage of fully accomplishing what two nuts (nut and lock-nut) are intended to do, (but in reality do not accomplish,) but has also the very considerable advantage that the same can be screwed to any part of an iron core where a short thread has been cut without tapering the ends of the bolt or providing them with threads. Even curves and angles offer no resistance, and, further, a much flatter—that is to say, less deep—
thread is sufficient, which, again, means less weakening of the core or bolt. Finally, this nut can be secured in any place by means of a set-screw which does not touch the thread; but not only with the aid of a set-screw, but in a far more simple and safe and automatic manner, can the nut be fastened as described in the following. Finally, the manufacture is much cheaper than with the ordinary nut.

The drawings show a few sample constructions.

Figure 1:
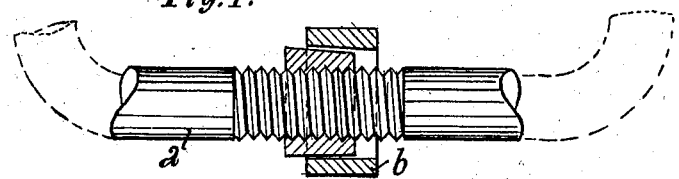
Figure 2:
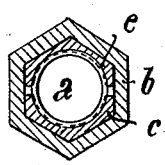
Figure 3:
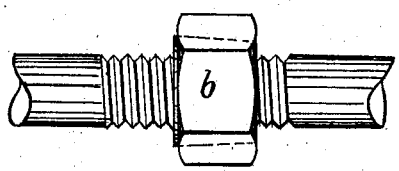
Figure 4:
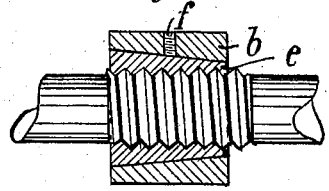
Figure 5:
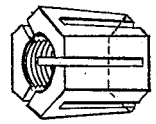
Figure 6:
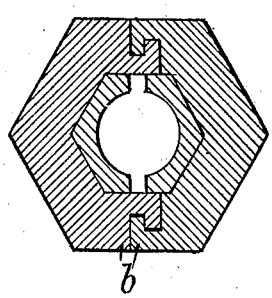

Figure 1 represents an iron core having only a thread in the middle, without tapering or pared ends, with the new nut in a longitudinal section. Fig. 2 shows a new nut in cross-section. Fig. 3 represents an iron core, the same as in Fig. 1, with a side view of the nut. Fig. 4 shows a longitudinal section of the nut with the set-screw $f$, which latter secures the thread-shells in the mantle. Fig. 5 shows a threaded conical tube cut in at the ends alternately, but not cut quite through. Fig. 6 shows a sample of a divided mantle which is stretched and held fast through the expansion of the thread-shells.

The cone or pyramid shaped thread-shells, which may be composed of two or several parts $c$ and $e$, are so formed that if they are placed against the threaded core $a$ and the mantle $b$ is passed over them they must follow the rotation of the mantle, which is probably best attained by the hexagonal form nuts usually have. If the mantle $b$ of the nut touches against an abutment or a band, peg, or another nut, the thread-shells must on a further rotation of the mantle enter the mantle, and the lateral pressure is transmitted vertically to the thread-core in consequence of the conical or wedge-shaped form of the thread-shells and in such a manner that all the surfaces of the thread are placed firmly and uniformly against each other and are therefore pressed together energetically.

In the ordinary nut with lock-nut the surfaces of the thread do not set at all against one side of the thread, and against the other only partially. Sometimes the opposite points only of the thread touch each other, which then frequently on the nut being drawn tight are driven out of their place, (get twisted and are screwed wrong.) In order to prevent this danger of wrong screwing or overscrewing as much as possible, threads had up to the present to be cut in very deep, which of course means a great weakening of the thread-core. With the new nut an overscrewing is impossible, even if the thread be as flat as can be imagined. The weakening of the thread-core is therefore reduced to a minimum. As the opening in the mantle of the nut is larger than the diameter of the core, it is possible to pass the former over curves, angles, and handles, as indicated by the dash-line in Fig. 1.

If this new nut is to be screwed tight at any point of the thread, a temporary abutment is formed by a second nut. The nut to be fixed is screwed against this. The thread-shells are then fixed by means of the set-screw $f$ in the mantle, or the thread-shells fix themselves in consequence of having the conical contact and gliding surfaces slightly roughened, whereby the fixing of the thread-shells through the rather strong union with the mantle is attained in the highest degree, whereupon the abutment-nut is removed. The nut tightened in this way can only by violence be loosened or turned. This unconditional firmness of the new nut is, among others, of the greatest importance for the rails of railways. The divided mantle, Fig. 6, is excellently suited to allow of putting the nut between seats and places difficult to reach. The manufacture is greatly simplified by the fact that the mantles and thread-shells can be pressed over suitable core-bars without the extra operation of cutting the threads in.

What we claim as our invention, and desire to secure by United States Letters Patent, is—

1. A nut formed by a mantle in the shape of a nut with shells or plates provided with threads placed inside of this mantle, the conical parts of said thread being fixed by a set-screw in the mantle of the nut, substantially as set forth.

2. A nut formed by a mantle in the shape of a nut with shells or plates provided with threads, placed inside of this mantle, said mantle being divided and so constructed that it is adapted to be stretched by the expansion of the thread-shells and thus held fast, substantially as and for the purpose set forth.

In testimony whereof we have signed our names to this specification in the presence of two subscribing witnesses.

MAX SCHUBERT.
OTTO RECHNITZ.

Witnesses:
WOLDEMAR HAUPT
HENRY HASPER.